(12) United States Patent
Tom

(10) Patent No.: US 6,578,895 B1
(45) Date of Patent: Jun. 17, 2003

(54) SUN VISOR HAVING A CORRUGATED CORE

(75) Inventor: Mark Tom, Coldwater, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/005,335

(22) Filed: Dec. 5, 2001

(51) Int. Cl.$^7$ ................................................. B60J 3/00
(52) U.S. Cl. ..................... 296/97.1; 296/97.5; 296/97.9
(58) Field of Search ............... 296/97.1, 97.5, 296/97.12, 97.9; 362/492; 224/312; 2/12

(56) References Cited

U.S. PATENT DOCUMENTS

| | | | | |
|---|---|---|---|---|
| 3,827,748 A | * | 8/1974 | Herr et al. ................. | 296/97.1 |
| 4,163,579 A | * | 8/1979 | Mahler et al. ............. | 296/97.1 |
| 4,292,689 A | * | 10/1981 | Townsend, Jr. ............. | 2/12 |
| 4,384,740 A | * | 5/1983 | Marrotta .................... | 296/97.1 |
| 4,477,116 A | * | 10/1984 | Viertel et al. ............. | 296/97.1 |
| 4,711,483 A | * | 12/1987 | Gulette et al. ............. | 296/97.5 |
| 4,883,304 A | * | 11/1989 | Elliott ........................ | 296/97.9 |
| 4,886,696 A | * | 12/1989 | Bainbridge ................. | 296/211 |
| 5,057,176 A | * | 10/1991 | Bainbridge ................. | 156/222 |
| 5,209,880 A | * | 5/1993 | Miwa ......................... | 156/182 |
| 5,308,136 A | * | 5/1994 | Schwarz et al. ........... | 296/97.1 |
| 5,365,416 A | | 11/1994 | Peterson ..................... | 362/135 |
| 5,577,791 A | * | 11/1996 | Viertel et al. ............. | 296/97.5 |
| 5,716,092 A | * | 2/1998 | Dellinger et al. .......... | 296/97.1 |
| 5,779,298 A | * | 7/1998 | Smelser et al. ............ | 296/97.1 |
| 5,860,690 A | * | 1/1999 | Dellinger et al. .......... | 296/97.1 |
| 5,887,933 A | * | 3/1999 | Peterson ..................... | 296/97.1 |
| 5,984,398 A | * | 11/1999 | Crotty, III .................. | 296/97.1 |
| 6,024,399 A | * | 2/2000 | Viertel et al. ............. | 296/97.1 |
| 6,033,005 A | | 3/2000 | Crotty, III | |
| 6,131,985 A | * | 10/2000 | Twietmeyer et al. ....... | 296/97.1 |
| 6,199,934 B1 | | 3/2001 | Sturt | |
| 6,302,467 B1 | * | 10/2001 | Crotty et al. .............. | 296/97.1 |
| 6,367,861 B1 | * | 4/2002 | Crotty et al. .............. | 296/97.1 |
| 6,409,245 B1 | * | 6/2002 | Crotty et al. .............. | 296/97.1 |
| 2001/0024048 A1 | * | 9/2001 | Hobson et al. ............ | 296/97.1 |
| 2002/0113454 A1 | * | 8/2002 | Crotty et al. .............. | 296/97.1 |

FOREIGN PATENT DOCUMENTS

| | | | |
|---|---|---|---|
| GB | 2032368 | * | 10/1979 |
| JP | 56-21914 | * | 2/1981 |
| JP | 62-8826 | * | 1/1987 |
| JP | 63-166622 | * | 7/1988 |
| JP | 8-91046 | * | 4/1996 |
| JP | 11-91351 | * | 4/1999 |

* cited by examiner

*Primary Examiner*—Kiran Patel
(74) *Attorney, Agent, or Firm*—Rader, Fishman & Grauer PLLC

(57) ABSTRACT

A sun visor is provided that includes a core having a periphery that defines an edge of the sun visor. The core comprises a plurality of layers with at least one layer being corrugated. The corrugated layer is characterized by a plurality of alternating ridges and troughs that strengthen the core without adding weight. An upholstery cover is disposed over the core and forms an exterior surface of the sun visor. In one embodiment, the core comprises a plurality of planar and corrugated layers. In another embodiment, the core comprises a rigid panel and a foundation disposed over the panel. The foundation includes a plurality of layers with at least one layer being corrugated to increase the thickness of the core without substantially adding weight to the sun visor.

4 Claims, 4 Drawing Sheets

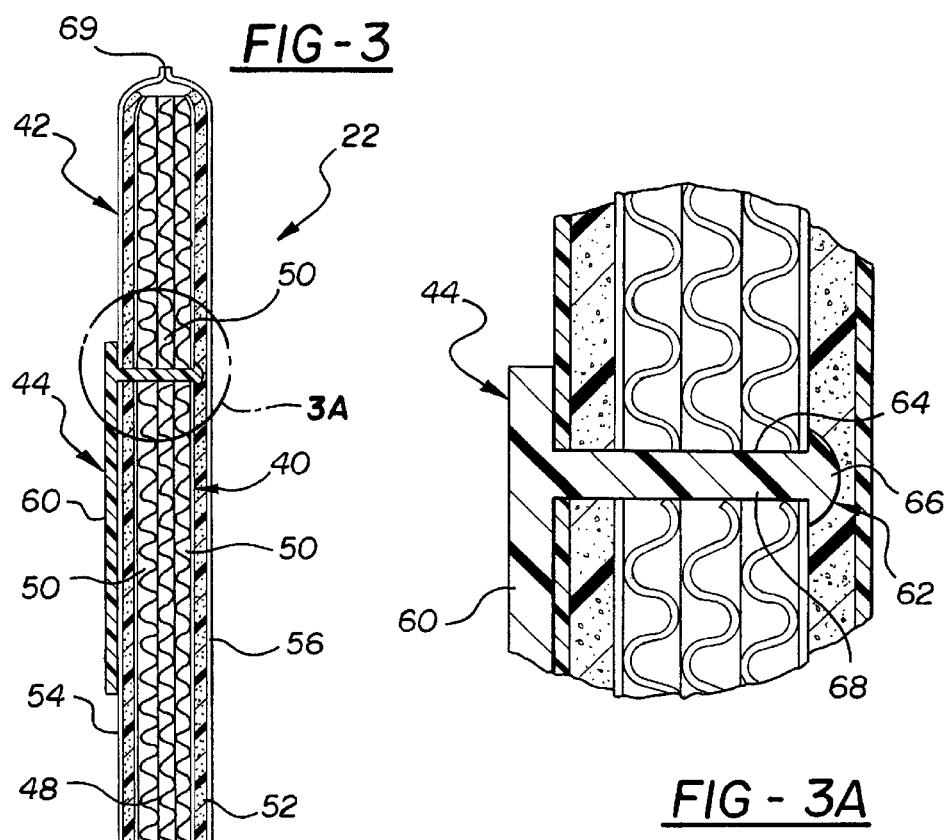
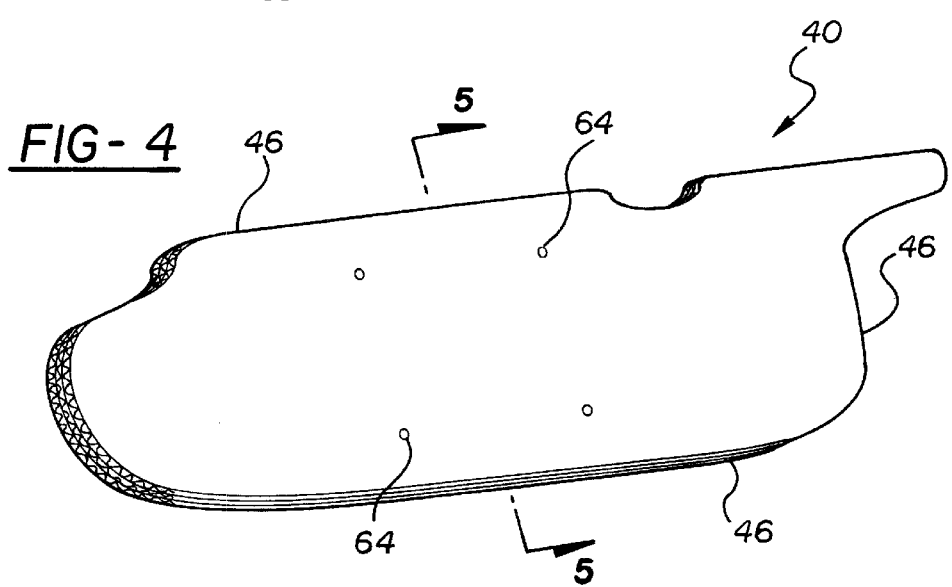

SUN VISOR HAVING A CORRUGATED CORE

FIELD OF THE INVENTION

The present invention relates generally to a vehicle sun visor and, more particularly, to a sun visor having a corrugated core.

BACKGROUND OF THE INVENTION

It is well known to provide a sun visor for a windshield of a vehicle, wherein the sun visor is mounted to a roof panel of the vehicle for movement between a stored position adjacent a headliner, a first use position adjacent a windshield, and a second use position adjacent a side door window opening. One prior art sun visor comprises a solid core of pressed wood material with an outer upholstery covering of a foam-backed cloth adhered to or otherwise connected to a thin self-supporting kraft paper foundation. The covering is folded over the core and is edge sewn along a seam circumjacent the periphery of the core.

More recently, a sun visor having a molded plastic inner core with an outer foundation folded over the plastic core has been developed. The foundation is folded over the plastic core in the manner previously described.

Further, in another known sun visor, a molded polymer shell is provided. The molded polymer shell includes an upholstery cover fused to the exterior of the shell.

The primary disadvantages of the cores and shell configurations of the above described known sun visors is cost and weight. For example, the polymer cores and polymer shells generally require the use of relatively expensive materials. In addition, such known cores and shells also involve manufacturing techniques, such as injection molding, which can render the sun visors costly and/or inefficient to manufacture. In another example, pressed wood cores are generally heavier than relatively lightweight materials, such as kraft paper. Accordingly, there exists a need for a lightweight and cost effective core for a sun visor.

SUMMARY OF THE INVENTION

In accordance with a preferred embodiment of the present invention, a sun visor is provided that includes a core having a periphery that defines an edge of the sun visor. The core includes a plurality of layers with at least one layer being corrugated to increase the strength and rigidity of the core. An upholstery cover is disposed over the core and forms an exterior surface of the sun visor. The upholstery cover may be fixedly attached to the core or, alternatively, the upholstery cover may envelope the core.

In another embodiment, a sun visor is provided that includes a core comprising a rigid panel and a foundation disposed over the panel. The foundation includes a plurality of layers with at least one layer being corrugated to increase the thickness of the core without substantially adding weight to the sun visor. An upholstery cover is disposed over the foundation and forms an exterior surface of the sun visor.

Among other advantages, the sun visor of the present invention is both easier and less expensive to manufacture than the prior art, yet provides a core exhibiting a strength and rigidity comparable to sun visors having molded polymeric cores or shells. Another advantage is that the sun visor core may be manufactured using a relatively inexpensive material, such as cardboard. Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 3 is a cross sectional view of the assembled sun visor of FIG. 2.

FIG. 3A is a detailed view of the cross section of the assembled sun visor of FIG. 3.

FIG. 4 is a perspective view of a sun visor core according to a preferred embodiment of the present invention.

DESCRIPTION OF THE PREFERRED EMBODIMENT

Figure 1:
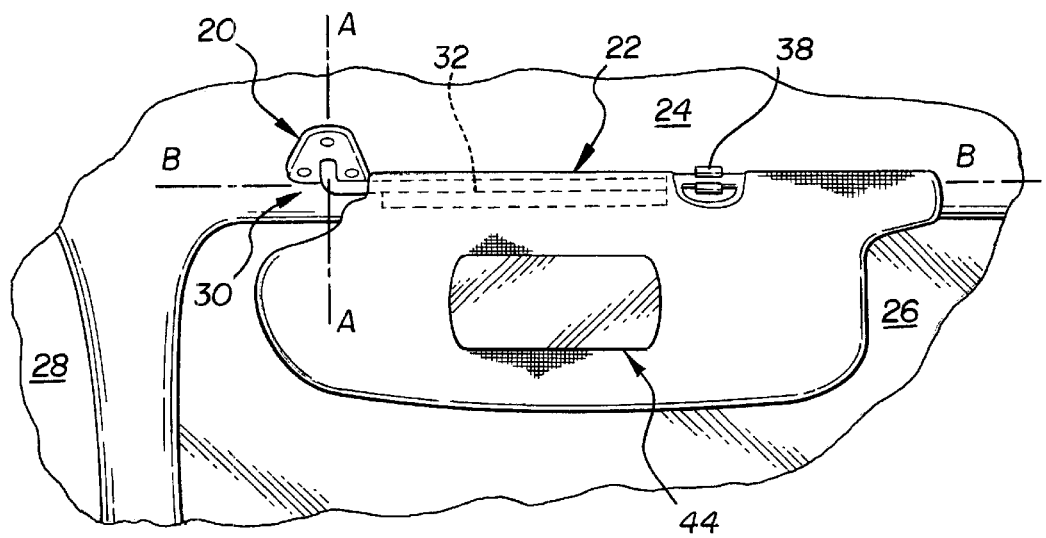
FIG. 1 is a perspective view of a sun visor in a "use" position.

Referring now to the drawings, the preferred embodiments of the present invention are described in detail. As illustrated in FIG. 1, a sun visor mounting bracket assembly 20 typically secures a sun visor 22 to a vehicle roof and/or headliner 24 and permits sun visor 22 to be pivoted about a substantially vertical axis A—A from a position proximate a windshield 26 to a position proximate a side window 28. As is known in the art, sun visor 22 is rotatably supported on a visor shaft 30 in a hinge assembly 32 extending from mounting bracket assembly 20 for pivoting the sun visor 22 about a substantially horizontal axis B—B between a "stored" position adjacent an interior headliner 24 and a "use" position adjacent the vehicle windshield 26. As is also known in the art, sun visor 22 may be secured to a support clip 38 in a selectively disengagable press-fit manner to maintain its position.

Figure 2:
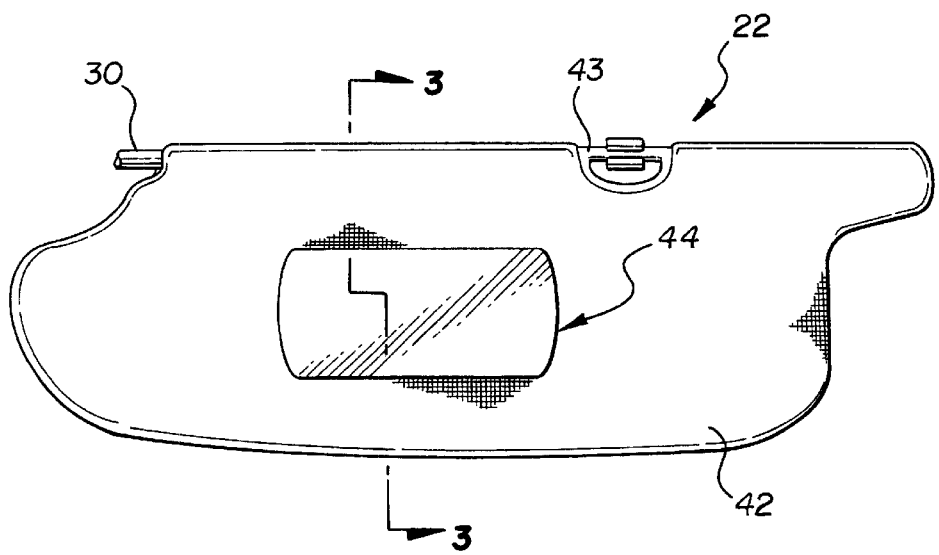
FIG. 2 is a perspective view of an assembled sun visor according to a preferred embodiment of the present invention.

FIGS. 2 and 3 are a perspective view and a cross sectional view, respectively, of sun visor 22 according to a preferred embodiment of the present invention. As is best seen in FIG. 3, sun visor 22 generally includes a core 40 and an upholstery cover material 42 that surrounds core 40. A pin assembly 43 is provided over cover 42, as shown in FIG. 2, and is received into support clip 38 that extends from the headliner 24 of the vehicle. Sun visor assembly 22 also includes, optionally, a vanity mirror assembly 44, which may be of a type well known in the art.

Figure 5:
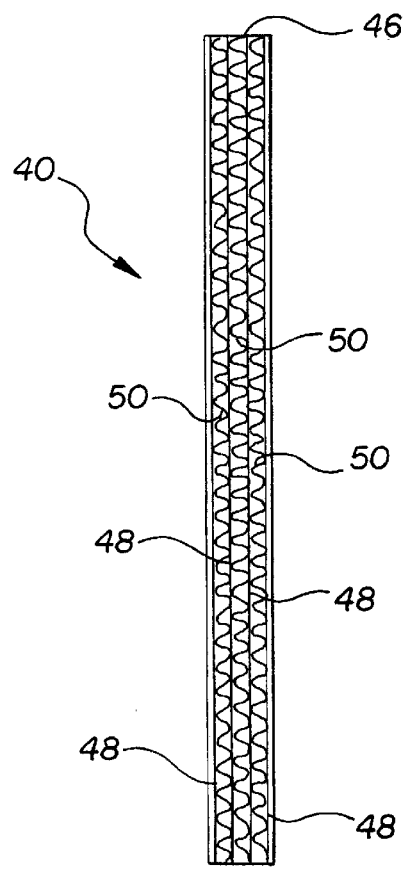
FIG. 5 is a cross sectional view of the sun visor core of FIG. 4.

The construction of core 40 can be better appreciated with reference to FIGS. 4 and 5. As illustrated in FIG. 4, core 40 includes a periphery 46 that defines an edge of sun visor 22.

In a preferred embodiment, core 40 is a rigid or semi-rigid panel made from a lightweight material, such as cardboard or kraft paper, having at least one layer that is corrugated to increase the strength and rigidity of the panel. The corrugated layer is characterized by a plurality of alternating ridges and troughs that are configured in size, shape and position to strengthen the core without substantially adding weight. The ridges and troughs of the corrugated layers may extend horizontally along the length of core 40, as illustrated in FIGS. 4 and 5, or may extend vertically along the width of core 40. It will be appreciated that other materials, such as plastic or other lightweight material, may also be suitably employed in core 40, albeit at a higher material cost, without departing from the scope of the invention.

Core 40 preferably includes at least one corrugated layer 50 with planar layers 48 positioned on either side of the corrugated layer 50. For core 40 that has multiple corrugated layers 50, planar layers 48 are arranged in an alternating manner with planar layers 48 being disposed on the outermost surfaces, as shown in FIG. 5. The corrugated layers 50 may be bonded to the planer layers 48 using a glue or similar adhesive to create a unitary panel or, alternatively, may be freely disposed adjacent the planar layers 48 and held together by upholstery cover 42 after assembly.

Referring again to FIG. 3, sun visor assembly 22 also includes, optionally, a backing layer 52, such as a foam, fabric or a combination thereof, between core 40 and upholstery cover 42. Backing layer 52 may be bonded to core 40 with glue or similar adhesive. Alternatively, backing layer 52 may be freely disposed over core 40 so as to envelope core 40. Similarly, backing layer 52 may be bonded to cover 42 with a glue or similar adhesive such that cover 42 is a multi-layer composite. Backing layer 52 is provided to add fullness to the sun visor assembly and offers a padded feel when gripped by an occupant of the vehicle.

As illustrated in FIGS. 2 and 3, upholstery cover 42 is disposed over core 40 and forms an exterior surface of the sun visor 22. Upholstery cover 42 is preferably a non-fabric material, such as nylon, but may comprise fabric or fabric-like materials, including, but not limited to, cloth, cloth with foam backing or felt. When a non-fabric material such as nylon is employed, upholstery cover 42 preferably includes first and second cover sections 54 and 56, respectively, that are joined at the periphery 46 of core 40 to create a substantially uniform cover over the entire surface of core 40. The use of a non-fabric material allows the two cover sections 54, 56 to be joined without the use of an adhesive, such as by thermal fusion. However, as noted above, upholstery cover 42 may be made from any suitable material, may comprise one or more sections, and may be secured to core 40 using an adhesive or other means known in the art.

Figure 6:
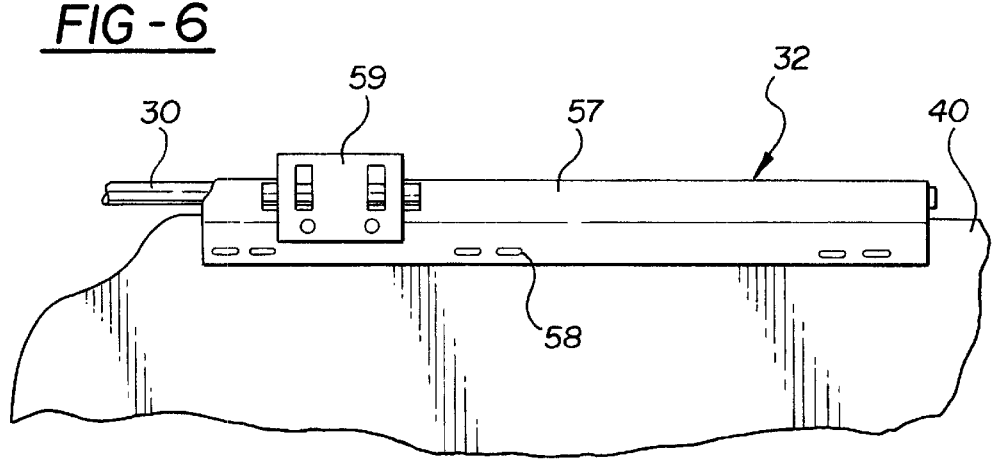
FIG. 6 is a partial plan view showing a hinge assembly secured to the corrugated core.

As shown in FIG. 6, core 40 is rotatably secured to support rod 30 via hinge assembly 32. Hinge assembly 32 comprises a generally U-shaped frame 57 that is secured to core 40 via a plurality of staples 58 or other fastening means known in the art, such as, for example, a rivet. A generally U-shaped detent clamp 59 is secured to core 40 about a recess in hinge assembly 32 to surround a portion of support rod 30. Detent clamp 59 is retained on core member 40 by one or more rivets or other suitable fastening means. Support rod 30 preferably includes one or more flats (not illustrated) that cooperate with detent clamp 59 to hold/lift the visor in the "stored" position. Hinge assembly 32 is pivotable about support rod 30 and the assembled sun visor 22 is pivotable therewith.

Referring to FIGS. 3 and 3A, mirror assembly 44 includes a frame 60 that is preferably attached to core 40 over cover 42. While mirror assembly 44 may be attached to core 40 in any suitable manner, the frame 60 is preferably heat staked to core 40 using one or more integrally formed thermoplastic stakes 62 that extend through a plurality of holes 64 cut or otherwise formed in core 40, as shown in FIG. 4. As the thermoplastic material, which is preferably polypropylene or ABS plastic, melts during heat staking, it flows against core 40 and forms a cap 66 that locks a stem 68 within core 40 and thereby secures mirror assembly 44 to core 40. Alternatively, mirror assembly may be disposed in a recess (not illustrated) that is cut or otherwise formed in one or more of the layers 48, 50 of core 40, enabling mirror assembly 44 to be mounted substantially flush with cover 42.

Figure 7:
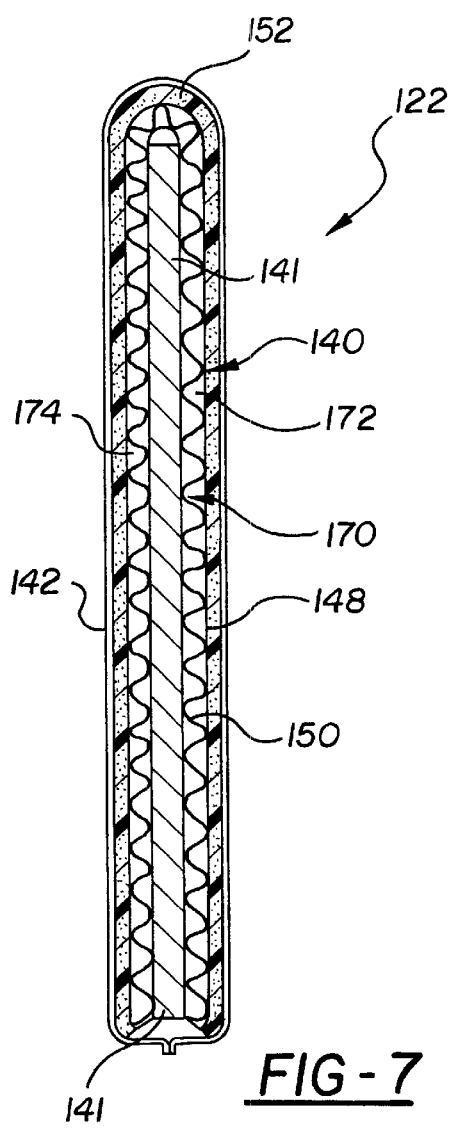
FIG. 7 is a cross sectional view of an assembled sun visor according to an alternate embodiment of the present invention.
Figure 8:
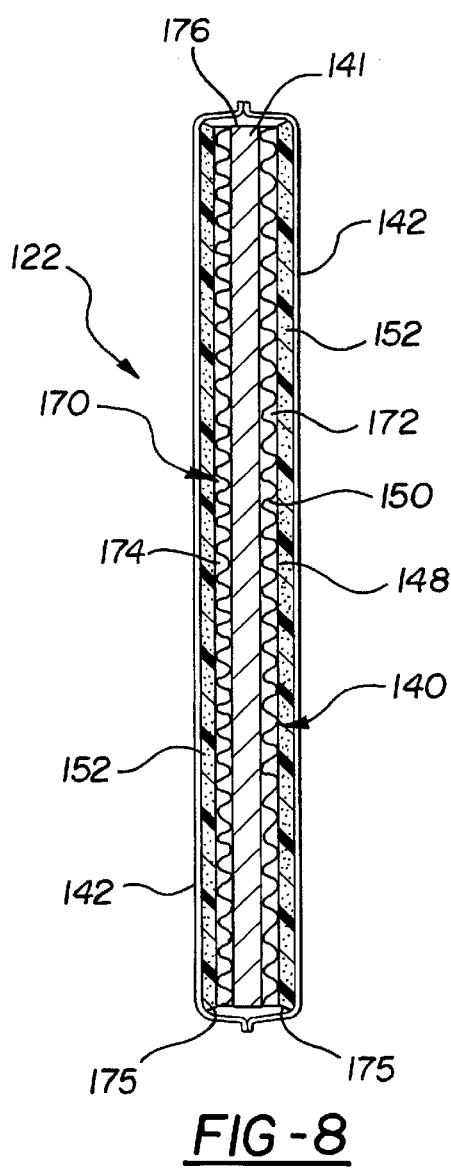
FIG. 8 is a cross sectional view of an assembled sun visor according to a yet another alternate embodiment of the present invention.

A cross-sectional view of another embodiment of the present invention is illustrated in FIGS. 7 and 8. In this embodiment, a sun visor assembly 122 is provided that includes a multi-layer core 140 comprising a rigid panel 141 and at least one corrugated layer 150 that forms a foundation 170 upon which a cover 142 and/or backing layer 152 is applied. Panel 141 preferably exhibits a substantially solid cross-section, but may include features such as holes or recesses to facilitate attachment of components, such as mirror assembly 44. Panel 141 preferably comprises a pressed wood material, such as "Superwood®" (a registered Trademark of Georgia-Pacific Corporation), which is a type of hardboard. Alternatively, panel may comprise other rigid or semi-rigid materials, such as, for example, other types of hardboard, fiberboard or plastic.

Foundation 170 is preferably formed of two halves 172 and 174, each comprising a lightweight material, such as cardboard. As illustrated in FIG. 7, foundation halves 172, 174 preferably include at least one corrugated layer 150 and at least one planer layer 148, but are not intended to be limited thereto. Accordingly, foundation halves 172, 174 may comprise a single corrugated layer 150 or any combination of corrugated and planer layers 150 and 148, respectively. Foundation halves 172, 174 may be formed as a single butterfly-like structure having an integrally formed living-hinge therebetween, as illustrated in FIG. 7, or may be two individual halves as illustrated in FIG. 8. Halves 172, 174 advantageously provide fullness to the visor core 140 without significantly increasing the weight of sun visor assembly 122. Additionally, halves 172, 174 allow rigid panel to advantageously exhibit a thinner cross-section than conventional pressed-wood sun visor cores without sacrificing the look and feel of the sun visor assembly.

Figure 9:
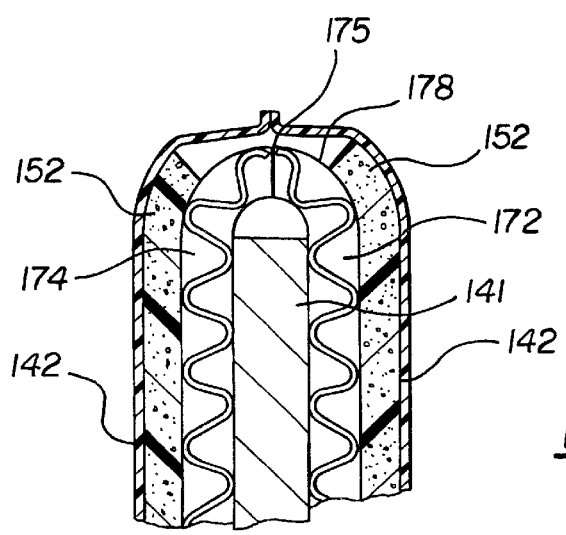
FIG. 9 is an enlarged cross-sectional view of still yet another alternate embodiment of the present invention.

As illustrated in FIG. 8, an outer periphery 175 of foundation halves 172, 174 may be substantially similar in shape to an outer periphery 176 of panel 141 or, as illustrated in FIG. 9, may extend over outer periphery 176. As illustrated in FIG. 9, outer periphery portions 175 of foundation halves 172 and 174 may mate to form a rounded edge whose outer surface is defined by a substantially semi-circular cross-section. The term "mate," as used herein, is to be construed broadly to include variations in the way in which the outer periphery 175 of halves 172 and 174 may align with one another in an assembled sun visor 122. However, when periphery portions 175 of halves 172 and 174 form a rounded edge, it is preferable that the radius of the outer surface be at least 3.2 mm and, more preferably, at least 3.5 mm. These dimensions advantageously permit sun visor 22 to satisfy sun visor standards and regulations promulgated by international authorities in the automotive industry.

While an exemplary method of assembling sun visor 22 according to the present invention will be described with reference to a sun visor construction having a non-fabric cover, such as nylon, the sun visor cover material and method of assembly are not intended to be so limited. According to the preferred embodiment, sun visor 22 is assembled by first die-cutting core 40 to the general shape of sun visor 22. As illustrated in FIG. 3, and by way of example only, core 40 is die-cut from a composite having three corrugated layers 50 sandwiched between four planer layers 48. The layers of the composite material are preferably pre-adhered to each other such that core 40 is created using a single cutting operation. However, as noted above, core 40 may comprise any number of corrugated layers 50 and planer layers 48 depending on the desired strength and rigidity of core 40. Additionally, each layer may be cut individually and assembled together to form core 40.

When inclusion of a mirror assembly 44 is desired, core 40 is preferably die-cut or otherwise formed with a plurality of holes 64 for attaching mirror assembly 44. Holes 64 may be die-cut during the same cutting operation used to cut the shape of core 40 or, alternatively, may be created in core 40 during a different manufacturing operation.

After core 40 has been formed, hinge assembly 32, visor shaft 30 and detent 59 may be attached to core 40. Upholstery cover 42 is then disposed over the entire outer surface of core 40 such that the two cover sections 54, 56 meet at the periphery 46 of core 40. If included, mirror assembly 44 is then attached to core 40 over cover 42 in a manner described above. If desirable, a backing layer 52 may be disposed between core 40 and upholstery cover 42 prior to overlaying cover 42 to add fullness to sun visor 22.

The core 40, backing layer 52, if included, and cover sections 54, 56 are then placed in a heated mold, whereby the two cover sections 54, 56 are pinched together under heat around the periphery 46 of core 40. As the nylon cover sections 54, 56 are pinched, the nylon material melts together forming a seam 69 that may include excess cover material projecting outwardly therefrom. The excess cover material is subsequently removed, such as by physically trimming the excess material, leaving a seam 69 between the first and second cover sections 54, 56. Additional features, such as pin assembly 43 may then be secured to sun visor 22 over cover 42, as described above.

Because the core 40 may be manufactured using a relatively inexpensive material such as cardboard, the tooling required to form the core is significantly less costly than tooling required to injection mold a polymeric core or shell. Moreover, the use of corrugated layer(s) 50 allows core 40 to be fully or partially manufactured out of a lightweight material, such as cardboard, without sacrificing the strength and rigidity found in sun visors having pressed-wood cores or molded polymeric cores and shells.

A method of assembling the alternate embodiments of FIGS. 7–9 is substantially similar to the method of assembling the preferred embodiment, except for the core 140. In these embodiments, the rigid panel 141 is first die-cut or otherwise formed to the shape of the sun visor core. In the embodiment of FIG. 7, the foundation 170 is die-cut from a composite that preferably includes one corrugated layer 150 pre-adhered to one planar layer 148. The foundation 170 is then folded unto itself creating the foundation halves 172, 174. The foundation halves 172, 174 may be adhered to the rigid panel using glue or similar adhesive or may be freely disposed against rigid panel 141 and held in place by cover 42.

In the embodiments of FIGS. 8 and 9, the periphery 175 of halves 172, 174 is die-cut or otherwise formed to the general shape of rigid panel 141, as illustrated in FIG. 8 or, alternatively, slightly larger than the periphery 176 of rigid panel 141, as illustrated in FIG. 9. In the embodiment of FIG. 9, the periphery of foundation halves 172, 174 may be formed in a press to form a portion of the rounded edge. The foundation halves 172, 174 may be adhered to the rigid panel 141 using a glue or similar adhasive or, alternatively, may be freely disposed against rigid panel 141 and held in place by cover 42.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A sun visor assembly comprising:

a core having a periphery that defines an edge of the sun visor assembly, the core comprising at least one corrugated layer having a planar layer on either side of the corrugated layer, the corrugated layer being defined by a plurality of alternating peaks and troughs;

a hinge member secured to the core, the hinge member comprising a generally U-shaped frame disposed over an outer surface of the core; and an upholstery cover disposed over the core and forming an exterior surface of the sun visor.

2. The sun visor assembly of claim 1, wherein the hinge member is stapled to the core.

3. The sun visor assembly of claim 1 further including a support rod received in the hinge member, the hinge member including a generally U-shaped detent clamp secured to the core about a recess in the hinge member to surround a portion of support rod.

4. The sun visor assembly of claim 3, wherein the detent clamp is secured to the core by at least one rivet.

* * * * *